United States Patent
Mounzer et al.

(10) Patent No.: US 12,384,341 B2
(45) Date of Patent: Aug. 12, 2025

(54) METHOD FOR FREEING AT LEAST ONE LOCKED WHEEL OF A VEHICLE AND PROPULSION SYSTEM FOR A VEHICLE

(71) Applicant: Volvo Car Corporation, Gothenburg (SE)

(72) Inventors: Raid Mounzer, Gothenburg (SE); Mikael Riikonen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 246 days.

(21) Appl. No.: 18/045,665

(22) Filed: Oct. 11, 2022

(65) Prior Publication Data
US 2023/0130330 A1  Apr. 27, 2023

(30) Foreign Application Priority Data
Oct. 27, 2021   (EP) .................................. 21205000

(51) Int. Cl.
*B60T 8/58* (2006.01)
*B60T 8/1761* (2006.01)
(Continued)

(52) U.S. Cl.
CPC ............ *B60T 8/58* (2013.01); *B60T 8/17616* (2013.01); *B60T 17/22* (2013.01); *B60L 3/102* (2013.01);
(Continued)

(58) Field of Classification Search
CPC ...... B60L 3/102; B60L 3/104; B60L 2220/46; B60L 2240/12; B60L 2240/22;
(Continued)

(56) References Cited

U.S. PATENT DOCUMENTS

| | | | |
|---|---|---|---|
| 4,886,322 A | 12/1989 | Atkins | |
| 9,108,509 B2 * | 8/2015 | Watanabe | .......... B60K 23/0808 |

(Continued)

FOREIGN PATENT DOCUMENTS

| | | | |
|---|---|---|---|
| CN | 105774562 A | * | 7/2016 |
| GB | 2505668 A | | 3/2014 |

(Continued)

OTHER PUBLICATIONS

Communication pursuant to Article 94(3) EPC for EP Application No. 21 205 000.9 dated Jan. 30, 2024.
(Continued)

*Primary Examiner* — Phutthiwat Wongwian
*Assistant Examiner* — Mark L. Greene
(74) *Attorney, Agent, or Firm* — Amin, Turocy & Watson, LLP

(57) ABSTRACT

The disclosure relates to a method for freeing at least one locked wheel of a vehicle. One step of the method relates to identifying a locking scenario comprising the identification of the at least one locked wheel. A further method step is selecting a wheel freeing strategy being suitable for the identified locking scenario. Another step is directed to applying the selected wheel freeing strategy. Furthermore, the disclosure is directed to a propulsion system for a vehicle having at least one wheel. The propulsion system comprises at least one propulsion actuator. Moreover, at least one wheel speed sensor is provided, the wheel speed sensor being configured for detecting the rotational speed of the at least one wheel. Additionally, the propulsion system has at least one brake unit being configured for braking the at least one wheel and a control unit being configured for performing the above method.

20 Claims, 1 Drawing Sheet

Figure 1:
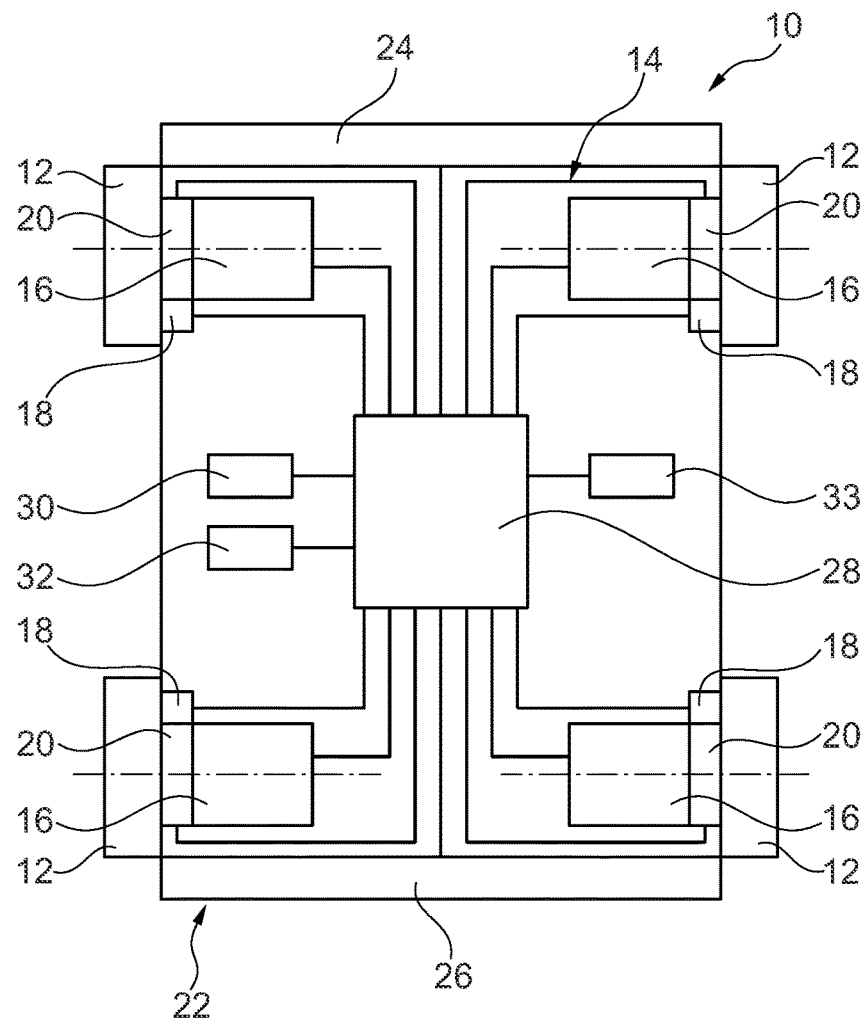

(51) Int. Cl.
*B60T 17/22* (2006.01)
*B60L 3/10* (2006.01)
*B60W 30/02* (2012.01)

(52) U.S. Cl.
CPC ............ *B60L 3/104* (2013.01); *B60L 2220/46* (2013.01); *B60L 2240/12* (2013.01); *B60L 2240/22* (2013.01); *B60W 30/02* (2013.01)

(58) Field of Classification Search
CPC ........ B60T 8/17616; B60T 8/58; B60T 17/22; B60W 30/02
See application file for complete search history.

(56) References Cited

U.S. PATENT DOCUMENTS

| | | | | |
|---|---|---|---|---|
| 9,550,486 | B2* | 1/2017 | Dudar | B60C 23/0408 |
| 10,889,274 | B2* | 1/2021 | Eckert | B60T 8/17554 |
| 10,889,290 | B2* | 1/2021 | Suetake | B60K 23/0808 |
| 11,104,315 | B2* | 8/2021 | Hilton | B60T 1/065 |
| 2009/0287378 | A1 | 11/2009 | Jess et al. | |
| 2023/0001907 | A1* | 1/2023 | Ohlig | F16D 66/00 |
| 2024/0140372 | A1* | 5/2024 | Chang | B60T 7/12 |
| 2024/0246518 | A1* | 7/2024 | Jo | B60T 13/745 |

FOREIGN PATENT DOCUMENTS

| | | | |
|---|---|---|---|
| GB | 2583054 A | | 10/2020 |
| JP | 2013132932 A | * | 7/2013 |
| JP | 2016043825 A | * | 4/2016 |

OTHER PUBLICATIONS

Extended EP Search Report for EP Patent Application No. 21205000.9 dated Apr. 26, 2022.

* cited by examiner

METHOD FOR FREEING AT LEAST ONE LOCKED WHEEL OF A VEHICLE AND PROPULSION SYSTEM FOR A VEHICLE

The present disclosure relates to a method for freeing at least one locked wheel of a vehicle.

Moreover, the disclosure is directed to a propulsion system for a vehicle having at least one wheel.

In the present context, a locked wheel is to be understood as a wheel not being able to rotate even though a corresponding brake is requested to be released and a driver of the vehicle requests propulsion torque. Such a wheel may also be designated a blocked wheel.

The problem of locked or blocked wheels is generally known. If a locked or blocked wheel remains undetected, it is possible that the corresponding vehicle is not able to move. Alternatively, it is possible that the vehicle does not react in an expected manner to a steering request or a request of propulsion torque. Moreover, a vehicle having a locked wheel may be subject to an undesired yaw moment resulting from the fact that a locked wheel is dragged.

The locking or blocking of a wheel may for example be caused by a rotating part of the wheel, e.g. a brake disk, being frozen or corroded against a fixed, i.e. non-rotating, part of the vehicle, e.g. a brake caliper.

An objective of the present disclosure is to provide a simple and reliable way to avoid the above mentioned problems being related to a locked wheel.

The problem is at least partially solved or alleviated by a method for freeing at least one locked wheel of a vehicle, comprising: identifying a locking scenario comprising the identification of the at least one locked wheel, selecting a wheel freeing strategy being suitable for the identified locking scenario, and applying the selected wheel freeing strategy.

In this context, the identification of the at least one locked wheel may be subject to a varying level of doubt or uncertainty. Therefore, for the present disclosure the identification of a locked wheel comprises both the identification of a wheel, which is certainly locked and a wheel which is suspected to be locked. Also, a wheel freeing strategy is to be understood in a broad manner Thus, a wheel freeing strategy can comprise any type of action that contributes to freeing the respective wheel.

The general idea underlying the present method is to identify the at least one locked wheel in a first step, be it with high certainty or with low certainty. Due to this measure, the freeing strategy can be specifically adapted to the at least one locked wheel, or more generally speaking the locking scenario. The measures of the freeing strategy can especially be limited to a single wheel or a subset of wheels of the vehicle. Consequently, the chances of success of the freeing strategy are enhanced as compared to known freeing strategies not taking into consideration which subset of a vehicle's wheels is locked. Consequently, the above problems relating to locked wheels are effectively avoided.

The method of the present disclosure may be a computer-implemented method.

The method may especially be applied in an autonomous or a partially autonomous vehicle. In such a scenario, the method is a computer-implemented method since there is no human driver being able to detect and handle the issue. In other words, the autonomous driver, i.e. a data processing system, needs to detect and handle the at least one locked wheel. Consequently, the steps of the method are performed automatically, i.e. without human interaction. Of course, the method is not limited to autonomous or partially autonomous vehicles. Also in vehicles having a human driver, such a method is beneficial since it at least helps the human driver to detect and solve the situation of a locked wheel. Usually, the method is more accurate in detecting and more effective in freeing the at least one locked wheel than a human driver. Also in the context of a vehicle having a human driver, the method steps can be performed automatically.

Identifying the locking scenario may comprise an evaluation whether the vehicle is moving. If the vehicle is not moving, it can be determined that either all driven wheels are locked or only some of the driven wheels are locked, wherein the remaining driven wheels are not able to move the vehicle. The latter can be the case if the free driven wheel or wheels are not able to provide sufficient torque to move the vehicle. This can be the case if the relevant propulsion actuators are not able to provide a propulsion torque of sufficient magnitude. Alternatively, the propulsion torque request of the human or autonomous driver may be too low. It is also possible that the free wheel or wheels are rotating in place. In this scenario, the friction between the wheel or wheels and the road or ground is not sufficient. If the vehicle is moving, the free driven wheel or wheels are able to provide sufficient torque to move the vehicle. This implies that the surface friction at the interface between the wheel and the road is sufficiently high. Thus, the evaluation whether the vehicle is moving provides further details of the locking scenario. This is helpful for deciding on an appropriate freeing strategy.

The movement of the vehicle can be detected through several means including a vehicle model, an inertial measurement unit, an evaluation of wheel speeds, a camera or a GPS unit.

Identifying the locking scenario may also comprise detecting one or more wheels rotating in place. This can be detected via a wheel speed sensor being attributed to each of the wheels. If it is found that the wheels are rotating and the vehicle does not move, one can conclude that the wheels are rotating in place. The movement of the vehicle can be detected by an inertial measurement unit or can be estimated from a vehicle model. Of course, only driven wheels are able to rotate in place. This kind of evaluation provides further details on the locking scenario. Thus, a good decision on a suitable freeing strategy is fostered.

In the present disclosure, a wheel speed sensor is to be understood as any means being able to measure, model, or estimate a rotation of a corresponding wheel. Consequently, also means that are configured for just checking if a wheel is rotating or not are to be considered wheel speed sensors. This can for example be done by a camera.

In an example, identifying the locking scenario may comprise identifying a propulsion actuator being coupled to the locked wheel. This information may be part of a vehicle model. A wheel to which a propulsion actuator is coupled may be called a driven wheel. A wheel to which no propulsion actuator is coupled is thus a non-driven wheel. It is noted that a propulsion actuator may be individual, i.e. being coupled to one single wheel only, or shared, i.e. being coupled to more than one wheel. In the latter case, the propulsion actuator is for example coupled to two wheels being attributed to the same axle. The identification of the locking scenario is thus enhanced by distinguishing between driven and non-driven wheels.

More generally speaking, in this context, a vehicle model may comprise information about a vehicle architecture and its layout, e.g. comprising information about the number of wheels and actuators as well as mechanical connections between actuators and wheels.

Moreover, identifying the at least one locked wheel may comprise detecting a wheel speed of each of the vehicle's wheels and additionally detecting and/or estimating a motion of the vehicle. Based on this, the respective wheel speeds of each of the vehicle's wheels are compared to the motion of the vehicle and/or the estimation of the motion of the vehicle. The motion of the vehicle may be longitudinal and/or lateral. The motion of the vehicle may be detected by an inertial measurement unit. An estimation of the motion may be based on a vehicle model or on a state estimation of the inertial measurement unit. To this end, an acceleration demand may be used as an input parameter for estimating a longitudinal motion. For estimating a lateral motion a steering angle may be used. Thus, precise knowledge of the locking scenario is provided. This allows for a good decision on an appropriate freeing strategy to be used.

The following results may be achieved:

It may be found that none of the wheels rotates, an effective longitudinal motion is zero, but an estimation of the longitudinal motion is bigger than zero. This may be due to the fact that all driven wheels are locked. Alternatively, at least one driven wheel may be free but unable to move the vehicle.

It is also possible that at least one, but not all driven wheels rotate, i.e. have a wheel speed being different from zero. At the same time, the effective longitudinal motion may be zero, but the estimation of the longitudinal motion may exceed zero. Such a situation may occur, if the driven wheel has an individual propulsion actuator and rotates in place. The situation may also occur if a locked driven wheel is connected to a freely spinning wheel through a differential. Moreover, a combination of wheels may share a common propulsion actuator.

In another situation, it may be detected that all driven wheels rotate, i.e. have a wheel speed differing from zero, but non-driven wheels stand still. However, the detected effective longitudinal motion is zero. This means that the resistance from the locked non-driven wheel or wheels render the vehicle immovable, i.e. the propulsion torque of the driven wheels is not sufficient to move the vehicle. It is noted that in this context it is sufficient to detect whether a wheel rotates or not. To this end, a camera can be used.

Alternatively, it may be detected that the vehicle is moving, wherein some of the wheels are locked, i.e. not rotating, and other wheels are rotating, i.e. have a wheel speed differing from zero. This means that the locked wheel or wheels are dragged.

It is also possible that identifying the at least one locked wheel comprises detecting a yaw motion of the vehicle and comparing the detected yaw motion to an estimated yaw motion of the vehicle. The locking scenario, i.e. the at least one locked wheel, can be identified due to the difference between the estimated and the actual yaw motion.

The yaw motion may be detected by an inertial measurement unit. Additionally or alternatively, the yaw motion can be detected by one or more cameras being mounted in the respective vehicle. It is also possible that the one or more cameras are mounted external to the respective vehicle, e.g. on other vehicles, and communicate with the vehicle through vehicle-to-vehicle communication or via a cloud computing system.

The method may be configured such that selecting a wheel freeing strategy and/or the wheel freeing strategy comprises detecting obstacles in the surroundings of the vehicle. To this end, detection results of a parking assistance system may be used. If the selection of a wheel freeing strategy comprises the detection of obstacles, strategies implying a movement of the vehicle towards the obstacles may be excluded or limited to a defined amount of movement. The selection of the wheel freeing strategy can thus take into account the environment of the vehicle.

Additionally, the environment can be monitored during the implementation of the freeing strategy, thereby avoiding an undesired collision of the vehicle with the obstacle. The method is thus rendered safe. This is especially the case if the vehicle is in a restricted environment.

The wheel freeing strategy may comprise increasing the level of requested torque for the vehicle and/or for the at least one locked wheel only. The intention of such a wheel freeing strategy is to free the locked wheel or the locked wheels due to the fact that the increased torque is at least potentially able to break the locking condition. The torque may be increased for the entire vehicle, i.e. for all driven wheels at the same time, for a subset of wheels or for an individual wheel. If the torque is increased for a subset of wheels or an individual wheel, corresponding propulsion actuators are necessary. Such a strategy is especially suitable if a driven wheel is locked since in such a condition, a defined and precise effort can be made to solve this situation.

Additionally or alternatively, the wheel freeing strategy may comprise requesting torque in alternating directions for the vehicle and/or for the at least one locked wheel only. Such a strategy follows the objective of breaking the locking condition by applying torque in alternating directions. In simplified words, a torque is applied to the locked wheel intending to move it forth and back. Again, if the torque is to be applied to an individual wheel or a subset of driven wheels, corresponding propulsion actuators are necessary. Also this strategy offers a precise way of freeing a locked wheel. It is especially suitable if the vehicle with the locked wheel is located in a restrained space.

It is also possible that the wheel freeing strategy comprises requesting intermittent torque for the vehicle and/or for the at least one locked wheel only. The objective of this strategy is to break the locking condition by repeatedly applying a torque. This strategy is also highly effective.

It is noted that the above freeing strategies can be applied separately from one another. Alternatively, it is possible to combine two or more of the above freeing strategies.

The method may also allow the at least one locked wheel to be dragged by at least one remaining wheel. Thus, in this wheel freeing strategy a torque is applied on the locked wheel via the road on which it is normally supposed to roll. This can be very effective, especially if the locked wheel is a non-driven one.

Alternatively or additionally, the wheel freeing strategy comprises stopping the vehicle and/or displaying a message to a user of the vehicle and/or sending a message to a user remote from the vehicle. These alternatives can be applied if a locking scenario is detected for which the above-mentioned freeing strategies are not applicable. The same is true for an unknown locking scenario. Furthermore, the second and third alternatives are particularly suitable for being applied in combination with other freeing strategies. According to the second alternative, the user of the vehicle can be informed about the applied freeing strategy and a corresponding progress. In the third alternative, a user can be a customer care center or a car repair shop. All alternatives, thus, comprise measures, which help freeing the locked wheel.

The wheel freeing strategy may also comprise the request for a braking action to be applied to at least one of the non-locked wheels. Thus, the non-locked wheels may be fully prevented from rotating. Alternatively, by the braking action, a defined slip or a limited range of motion, e.g. measured in numbers of rotation, may be allowed for the non-locked wheel. In this alternative, the brakes are not fully engaged. It is also possible that the braking action consists in reducing an air gap between a brake disk and a corresponding brake pad. In doing so, the brake system is prepared for reacting quickly to a subsequent brake request. All braking actions have the effect that the vehicle is prevented from moving in an undesired manner while the freeing strategy is applied. Thus, the operational safety of the vehicle is enhanced. Applying a braking action is especially useful if the vehicle is in a restrained environment.

The method can verify whether the at least one locked wheel has been unlocked. Preferably, this verification is performed regularly, e.g. after the lapse of a predefined time period. As a consequence thereof, the method for freeing a locked wheel can be terminated once its objective has been reached.

The method may also verify whether the identified locking scenario is still valid. If a locking scenario, having been identified initially, is not valid any more, an updated locking scenario can be identified and a suitable freeing strategy can be selected and applied. This is especially useful, if the initial locking scenario comprises two or more locked wheels and the application of a freeing strategy has only managed to free some of the locked wheels, but not all of them. In such a case, updating a freeing strategy based on an updated locking scenario enhances the effectiveness and efficiency of the method. Preferably, this verification is performed regularly, e.g. after the lapse of a predefined time period.

The problem is additionally solved by a propulsion system for a vehicle having at least one wheel. The propulsion system comprises at least one propulsion actuator being drivingly connectable to the at least one wheel. Moreover, the propulsion system has at least one wheel speed sensor being configured for detecting the rotational speed of the at least one wheel. Furthermore, the propulsion system is equipped with at least one brake unit being configured for braking the at least one wheel. Additionally, the propulsion system comprises a control unit being connected to the at least one propulsion actuator, the at least one wheel speed sensor and the at least one brake unit. The control unit is configured for performing the method according to the present disclosure. Thus, the propulsion system is able to free a locked wheel in a simple and reliable manner In this context, a wheel speed sensor is to be understood in a broad sense, such that any means being able to detect or estimate a wheel speed is to be considered a wheel speed sensor. The propulsion system according to the present disclosure can be used in a fully autonomous vehicle, a partly autonomous vehicle and in a vehicle being operated by a human driver. The problems related to at least one locked wheel can be solved in any of these configurations.

The propulsion system may additionally comprise a detection unit for detecting obstacles in the surroundings of the vehicle. Such a detection unit is connected to the control unit. Thus, the propulsion system is able to consider potential obstacles while the method for freeing a locked wheel is performed.

The detection unit may be a part of a parking assistance system.

The method of the present disclosure may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system.

The data processing means or the computer, respectively, may comprise one or more of a processor, a memory, a data interface, or the like.

It should be noted that the above examples may be combined with each other irrespective of the aspect involved. Accordingly, the method may be combined with structural features and, likewise, the apparatus and the system may be combined with features described above with regard to the method.

These and other aspects of the present invention will become apparent from and elucidated with reference to the examples described hereinafter.

Examples of the invention will be described in the following with reference to the following drawings.

Figure 2:
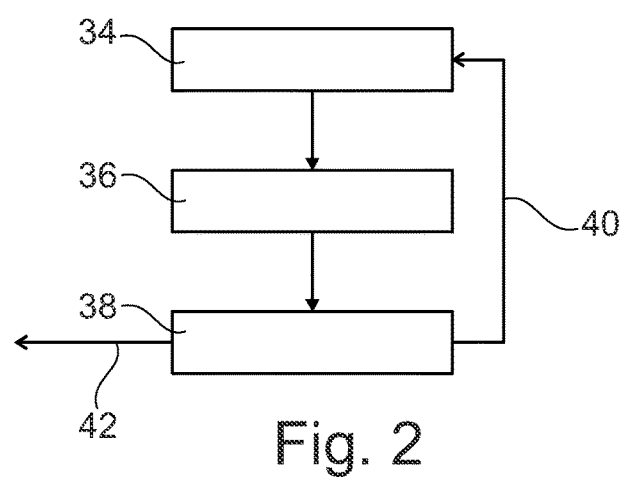

FIG. 1 shows a vehicle comprising a propulsion system according to the present disclosure and FIG. 2 shows a method according to the present disclosure.

The figures are merely schematic representations and serve only to illustrate examples of the disclosure. Identical or equivalent elements are in principle provided with the same reference signs.

FIG. 1 shows a vehicle 10 having four wheels 12 and a propulsion system 14.

The wheels 12 are coupled with the propulsion system 14.

In more detail, the exemplary propulsion system 14 comprises a total of four propulsion actuators 16, wherein each of the propulsion actuators 16 is drivingly connected to one of the wheels 12. The vehicle of the present example is thus a four-wheel-drive vehicle. Moreover, each of the wheels 12 can be actuated individually. The propulsion actuators 16 are for example electric propulsion actuators each comprising an electric motor.

Moreover, a wheel speed sensor 18 is attributed to each of the wheels 12. Each of the wheel speed sensors 18 is configured for detecting the rotational speed of the corresponding wheel 12.

Furthermore, the propulsion system 14 comprises a total of four brake units 20. Each of the brake units 20 is coupled with one of the wheels 12 such that each of the brake units 20 is configured for braking the corresponding wheel 12 individually.

The propulsion system 14 also has a detection unit 22 for detecting obstacles in the surroundings of the vehicle 10.

In the present example, the detection unit 22 comprises a front detection unit 24 and a rear detection unit 26.

Moreover, a control unit 28 is provided as a part of the propulsion system 14.

The control unit 28 is connected to each of the propulsion actuators 16, to each of the wheel speed sensors 18, and to each of the brake units 20.

Furthermore, the control unit 28 is connected to the front detection unit 24 and the rear detection unit 26.

Additionally, an inertial measurement unit 30 forms part of the propulsion system 14 and is connected to the control unit 28.

Beyond that a display unit 33 is provided which is connected to the control unit 28.

Also a vehicle model 32, i.e. an information model of the vehicle 10, is connected to the control unit 28.

Each of the connections of the control unit 28 is configured for transmitting communicative signals, especially request and data.

The control unit 28 is configured for performing a method for freeing a locked wheel which will be explained in the following with further reference to FIG. 2.

The method comprises essentially three steps, wherein in a first step 34 a locking scenario is identified. This comprises the identification of at least one locked wheel 12.

In the present example, the at least one locked wheel 12 is identified in that a wheel speed of each of the wheels 12 is detected by the corresponding wheel speed sensors 18.

Additionally, a longitudinal motion of the vehicle 10 is detected by the inertial measurement unit 30. In other words, the method evaluates if the vehicle is moving.

Subsequently, the respective wheel speeds of each of the wheels 12 can be compared to the longitudinal motion of the vehicle 10.

For the pure purpose of explanation, it is assumed that in a first illustrative example a longitudinal motion of the vehicle is detected. Furthermore, a wheel speed of the wheel 12 represented in the lower right corner of the propulsion system 14 is detected to be zero while the wheel speeds of the remaining wheels are different from zero.

Consequently, it is possible to detect that the wheel 12 represented in the lower right corner is locked and that it is dragged by the remaining wheels 12.

These detection results can be summarized as the identified locking scenario.

In a second illustrative example it is assumed that no longitudinal motion of the vehicle 10 is detected. Additionally, the wheel speed of the wheel 12 being represented in the lower right corner is detected to be different from zero, wherein the wheel speed of the remaining wheels is detected to be zero. Thus, one can conclude that the wheel 12 being represented in the lower right corner is rotating in place. Consequently, the locked wheel 12 has to be amongst the remaining wheels.

Additionally or alternatively, the at least one locked wheel, here for example the wheel 12 represented in the lower right corner, can also be identified in that a yaw motion of the vehicle 10 is detected and compared to an estimated yaw motion of the vehicle 10. The yaw motion can be detected by the inertial measurement unit 30. The estimated yaw motion can be calculated using the vehicle model 32.

Since each of the wheels 12 produces a characteristic deviation between the actual yaw motion and the estimated yaw motion when being locked, a locked wheel 12 can be identified by comparing these two yaw motion parameters.

Strictly speaking, no wheel speed sensors 18 are necessary if the locked wheel is to be detected via the yaw motion. However, assessing the yaw motion and the wheel speed at the same time enhances the reliability of the detection result.

The identification of the locking scenario may make further use of the vehicle model 32 in that the propulsion actuator 16 being coupled to the locked wheel 12 is identified. Thus, the vehicle model 32 contains information about the relations between the propulsion actuators 16 and the wheels 12. In the example shown in FIG. 1, there is a 1:1 relationship between each propulsion actuator 16 and the corresponding wheel 12. However, it is also imaginable that only one propulsion actuator 16 is used per axle or that only the wheels of one axle are driven wheels, i.e. coupled to a propulsion actuator 16. This also forms part of the locking scenario.

Once the locking scenario has been identified, a wheel freeing strategy being suitable for the identified locking scenario is selected. This is a second step 36 of the method. Thereafter, in a third step 38, the selected wheel freeing strategy is applied.

Considering again the first illustrative example, having the wheel 12 represented in the lower right corner locked, an appropriate freeing strategy may be to increase the level of requested torque for the locked wheel 12 only. Another strategy that can be applied alternatively or additionally is to request torque in alternating directions for the locked wheel 12. Furthermore, intermittent torque for the locked wheel 12 can be requested. This can be done as an alternative to the freeing strategies mentioned before or in addition thereto.

A further freeing strategy consists in allowing the locked wheel 12 to be dragged by the remaining wheels. However, this strategy is less advantageous for the first illustrative example.

Beyond that, in the first illustrative example, the vehicle 10 is stopped and a braking action is requested for all non-locked wheels 12. Thus, the vehicle stands still during the application of the freeing strategy. Additionally, a message is displayed to a user of the vehicle via display unit 33, informing the user that a wheel freeing method is performed.

The selection of the wheel freeing strategy can also comprise the detection of obstacles in the surroundings of the vehicle. To this end the detection unit 22 is used. In the first illustrative example, the decision to stop the vehicle 10 and request a braking action for all non-locked wheels is for example due to obstacles detected in the surroundings of the vehicle 10. Thus, the risk of collision with these obstacles is remedied.

Also during the application of the freeing strategy the detection unit 22 may be used in order to monitor the surroundings and detect a potential shortening of a distance between the vehicle 10 and an obstacle in its surroundings.

The method periodically verifies whether the identified locking scenario is still valid. This is illustrated by an arrow 40. If a locking scenario has been found to be invalid, the method jumps back to the first step 34 and an updated locking scenario is identified.

Additionally, the method periodically verifies whether the locked wheel 12 has been unlocked. If so, the method can be abandoned. This is illustrated by an arrow 42.

Other variations to the disclosed examples can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
12 wheel
14 propulsion system
16 propulsion actuator 18 wheel speed sensor
20 brake unit
22 detection unit
24 front detection unit
26 rear detection unit
28 control unit
30 inertial measurement unit
32 vehicle model
33 display unit
34 first step
36 second step
38 third step
40 arrow
42 arrow

The invention claimed is:

1. A method for freeing at least one locked wheel of a vehicle, the method comprising:
 identifying, by a system of the vehicle, a locking scenario comprising the at least one locked wheel, wherein the identifying the locking scenario comprises;
  detecting one or more of the vehicle's wheels rotating in place, and at least one of:
   detecting a wheel speed of each of the vehicle's wheels, and detecting or estimating a motion of the vehicle, wherein the respective wheel speeds of each of the vehicle's wheels are compared to the motion of the vehicle or the estimation of the motion of the vehicle, or
   detecting a yaw motion of the vehicle and comparing the detected yaw motion to an estimated yaw motion of the vehicle; and
 selecting, by the system, a wheel freeing strategy being suitable for the identified locking scenario from a group of wheel freeing strategies; and
 applying, by the system, the selected wheel freeing strategy.

2. The method according to claim 1, wherein identifying the locking scenario further comprises evaluating whether the vehicle is moving.

3. The method according to claim 1, wherein identifying the locking scenario further comprises identifying a propulsion actuator being coupled to the at least one locked wheel.

4. The method according to claim 1, wherein selecting the wheel freeing strategy comprises detecting obstacles in surroundings of the vehicle.

5. The method according to claim 1, wherein the wheel freeing strategy comprises at least one of:
 increasing a level of requested torque for the vehicle or for the at least one locked wheel,
 requesting torque in alternating directions for the vehicle or for the at least one locked wheel, or
 requesting intermittent torque for the vehicle or for the at least one locked wheel.

6. The method according to claim 1, wherein the wheel freeing strategy comprises allowing the at least one locked wheel to be dragged by at least one remaining wheel of the vehicle that is not locked.

7. The method according to claim 1, wherein the wheel freeing strategy comprises at least one of stopping the vehicle, displaying a message to a user of the vehicle, or sending a message to a user remote from the vehicle.

8. The method according to claim 1, wherein the wheel freeing strategy comprises a request for a braking action to be applied to at least one non-locked wheel of the vehicle.

9. The method according to claim 1, further comprising verifying, by the system, whether the at least one locked wheel has been unlocked.

10. The method according to claim 1, further comprising verifying, by the system, whether the identified locking scenario is still valid.

11. A propulsion system of a vehicle having at least one wheel, the propulsion system comprising:
 at least one propulsion actuator being drivingly connectable to the at least one wheel;
 at least one wheel speed sensor being configured for detecting the rotational speed of the at least one wheel;
 at least one brake unit being configured for braking the at least one wheel; and
 a control unit being connected to the at least one propulsion actuator, the at least one wheel speed sensor and the at least one brake unit, the control unit being configured to perform operations comprising:
  identifying a locking scenario comprising at least one locked wheel, wherein a locked wheel is a wheel not being able to rotate even though a corresponding brake is requested to be released and a driver of the vehicle requests propulsion torque, and wherein the identifying the locking scenario comprises at least one of:
   detecting a wheel speed of each of the vehicle's wheels, and detecting or estimating a motion of the vehicle, wherein the respective wheel speeds of each of the vehicle's wheels are compared to the motion of the vehicle or the estimation of the motion of the vehicle, or
   detecting a yaw motion of the vehicle and comparing the detected yaw motion to an estimated yaw motion of the vehicle; and
  selecting a wheel freeing strategy being suitable for the identified locking scenario from a group of wheel freeing strategies, wherein selecting the wheel freeing strategy comprises detecting obstacles in surroundings of the vehicle; and
  applying the selected wheel freeing strategy.

12. The propulsion system according to claim 11, wherein the group of wheel freeing strategies comprises at least one of:
 increasing a level of requested torque for the vehicle or for the at least one locked wheel only,
 requesting torque in alternating directions for the vehicle or for the at least one locked wheel,
 requesting intermittent torque for the vehicle or for the at least one locked wheel, allowing the at least one locked wheel to be dragged by at least one remaining wheel of the vehicle that is not locked,
 a request for a braking action to be applied to at least one non-locked wheel of the vehicle,
 stopping the vehicle,
 displaying a message to a user of the vehicle, or
 sending a message to a user remote from the vehicle.

13. The propulsion system according to claim 11, wherein the operations further comprise verifying whether the at least one locked wheel has been unlocked.

14. The propulsion system according to claim 11, wherein the operations further comprise verifying whether the identified locking scenario is still valid.

15. A method for freeing at least one locked wheel of a vehicle, wherein a locked wheel is a wheel not being able to rotate even though a corresponding brake is requested to be released and a driver of the vehicle requests propulsion torque, the method comprising:
 identifying, by a system of the vehicle, a locking scenario comprising the at least one locked wheel;

selecting, by the system, at least one wheel freeing strategy being suitable for the identified locking scenario from a group of wheel freeing strategies, wherein the at least one wheel freeing strategy comprises a request for a braking action to be applied to at least one non-locked wheel of the vehicle; and applying, by the system, the selected at least one wheel freeing strategy.

16. The method according to claim 15, wherein identifying the locking scenario comprises evaluating whether the vehicle is moving.

17. The method according to claim 15, wherein identifying the locking scenario comprises detecting of one or more wheels rotating in place.

18. The method according to claim 15, wherein identifying the locking scenario further comprises identifying a propulsion actuator being coupled to the at least one locked wheel.

19. The method according to claim 15, wherein identifying the locking scenario further comprises detecting a yaw motion of the vehicle and comparing the detected yaw motion to an estimated yaw motion of the vehicle.

20. The method according to claim 15, wherein identifying the locking scenario further comprises detecting a wheel speed of each of the vehicle's wheels, and detecting or estimating a motion of the vehicle, wherein the respective wheel speeds of each of the vehicle's wheels are compared to the motion of the vehicle or the estimation of the motion of the vehicle.

\* \* \* \* \*